(12) United States Patent
Kluge et al.

(10) Patent No.: US 12,498,708 B2
(45) Date of Patent: Dec. 16, 2025

(54) EVENT-ORIENTED TRANSMISSION OF MEASURED PROCESS VALUES

(71) Applicant: Siemens Aktiengesellschaft, Munich (DE)

(72) Inventors: Georg Kluge, Linkenheim (DE); Benjamin Lutz, Pfinztal (DE)

(73) Assignee: Siemens Aktiengesellschaft, Munich (DE)

( * ) Notice: Subject to any disclaimer, the term of this patent is extended or adjusted under 35 U.S.C. 154(b) by 586 days.

(21) Appl. No.: 17/762,632

(22) PCT Filed: Sep. 16, 2020

(86) PCT No.: PCT/EP2020/075822
§ 371 (c)(1),
(2) Date: Mar. 22, 2022

(87) PCT Pub. No.: WO2021/058345
PCT Pub. Date: Apr. 1, 2021

(65) Prior Publication Data
US 2022/0342406 A1 Oct. 27, 2022

(30) Foreign Application Priority Data
Sep. 24, 2019 (EP) ...................................... 19199271

(51) Int. Cl.
G05B 23/02 (2006.01)
(52) U.S. Cl.
CPC ................................ *G05B 23/0221* (2013.01)
(58) Field of Classification Search
CPC .................................................. G05B 23/0221
See application file for complete search history.

(56) References Cited

U.S. PATENT DOCUMENTS

| 4,748,404 A | 5/1988 | Heinze et al. |
| 2005/0088196 A1 | 4/2005 | Choi et al. |

(Continued)

FOREIGN PATENT DOCUMENTS

| CN | 102645270 | 8/2012 |
| CN | 103842770 | 6/2014 |

(Continued)

OTHER PUBLICATIONS

PCT International Search Report dated Dec. 22, 2020 based on PCT/EP2020/075822 filed Sep. 16, 2020.

(Continued)

*Primary Examiner* — Thomas C Lee
*Assistant Examiner* — Tyler Dean Hedrick
(74) *Attorney, Agent, or Firm* — Cozen O'Connor

(57) ABSTRACT

A method for event-oriented transmission of measured process values includes receiving the measured process values via an automation device of a control system of a process plant; automatically performing sensitization or desensitization of a measurement range of the measured process values on the automation device where, during sensitization or desensitization and depending on an undershoot of a minimal transmission rate of the measured process values from a measurement device to the automation device or an overshoot of a maximum transmission rate of the measured process values from the measurement device to the automation device, the measurement range is automatically decreased during sensitization and increased during desensitization by the automation device via a heuristic method, and transmitting the measured process values, on an event-oriented basis, to the operator station server of the control system of the process plant, where an event represents a predetermined change to the measured process values.

5 Claims, 4 Drawing Sheets

(56) References Cited

U.S. PATENT DOCUMENTS

| | | | |
|---|---|---|---|
| 2010/0121974 A1* | 5/2010 | Einarsson | H04L 47/25 |
| | | | 370/328 |
| 2014/0233040 A1 | 8/2014 | Gergen et al. | |
| 2014/0337321 A1* | 11/2014 | Coyote | G06F 3/04842 |
| | | | 707/722 |
| 2018/0049239 A1* | 2/2018 | Tenny | H04W 72/12 |
| 2018/0120806 A1 | 5/2018 | Sawaragi | |
| 2018/0372526 A1 | 12/2018 | Welle et al. | |
| 2019/0058666 A1* | 2/2019 | Pudlewski | H04L 47/27 |
| 2019/0171197 A1 | 6/2019 | Kahabka et al. | |
| 2019/0331118 A1 | 10/2019 | Aarestrup et al. | |
| 2020/0344303 A1* | 10/2020 | Ljung | H04L 67/10 |
| 2022/0163947 A1* | 5/2022 | Michan | G05B 23/0281 |

FOREIGN PATENT DOCUMENTS

| | | |
|---|---|---|
| CN | 107301353 | 10/2017 |
| CN | 108008687 | 5/2018 |
| CN | 109115304 | 1/2019 |
| CN | 109870999 | 6/2019 |
| CN | 110100100 | 8/2019 |
| EP | 3354419 | 8/2018 |

OTHER PUBLICATIONS

EP Search Report dated Apr. 14, 2020 based on EP19199271.8 filed Sep. 24, 2019.

* cited by examiner

EVENT-ORIENTED TRANSMISSION OF MEASURED PROCESS VALUES

CROSS-REFERENCE TO RELATED APPLICATIONS

This is a U.S. national stage of application No. PCT/EP2020/075822 filed 16 Sep. 2020. Priority is claimed on European Application No. 19199271.8 filed 24 Sep. 2019, the content of which is incorporated herein by reference in its entirety.

FIELD OF THE INVENTION

The invention relates to industrial automation systems and, more particularly, to an automation device, a control system of a process installation and a method for the event-oriented transmission of process measurement values from at least one measurement device of the control system of the process installation to an operator station server of the control system of the process installation.

DESCRIPTION OF THE RELATED ART

In process automation, process data is generally relatively "slow". Accordingly, the transmission of process data between automations and operator station servers (for functions such as operator control and monitoring, or archiving) generally occurs on an event-driven basis and not on a time-driven (cyclical) basis. The aim here is to reduce the transmission traffic, as large amounts of process data (referred to as "process measurement values" in the following) arise in process-engineering installations in particular.

In event-driven transmission, a "thinning out" of the process measurement values is used. This means that process measurement values are only transmitted when there is a sufficiently large change, when an upper timeout has expired (which defines the minimum transmission rate), and when there are sufficiently large accumulated changes.

In order to cap the quantity of process measurement values when there are significant signal changes (for example, due to amplified noise, failure of sensors . . . ) during event-driven transmission, a lower timeout is also generally defined (maximum transmission rate). The object consists in thinning out the transmission of process measurement values between the upper and lower timeout such that there are always enough sampling points available for the reproduction of the course of the process data (trends), important events are not lost (for example, the point in time as of which the process value changes), and as little process data as possible/no unnecessary process data is transmitted.

For event-driven transmission, various methods have become established, which however have some disadvantages. The main disadvantage lies in a specific configuration of the event-driven transmission having to occur for each process measurement value. The project engineer must identify the precise measurement range, the change dynamics to be expected of the process-engineering process, etc. effectively for each measurement point, in order to be able to achieve an acceptable transmission behavior. This brings with it an enormous and iterative effort.

Even established methods that require less configuration, such as those used to reduce process-engineering archive data for example (BoxCar, SLIM, Swinging Door), can only be used to a limited extent for the transmission, as in these methods it is not current values, but rather past values, which are transmitted when leaving the tolerance bands. In this case, the operators would then be working with (old) values during the operator control and monitoring.

SUMMARY OF THE INVENTION

It is an object of the invention to provide a method and an associated automation device, which significantly simplify a configuration of an event-oriented transmission from a measurement device to a control system of a technical installation.

This and other objects and advantages are achieved in accordance with the invention by a method for the event-oriented transmission of process measurement values from at least one measurement device of a process installation to an operator station server of a control system of a process installation.

The method in accordance with the invention comprises a) receiving the process measurement values via an automation device, b) automatically sensitizing or desensitizing a measurement range of the process measurement values via the automation device, and c) performing an event-oriented transmission of the process measurement values to the operator station server.

The process installation may be, for example, a chemical, pharmaceutical or petrochemical installation, or an installation from the food and beverage industry.

These process installations each have a control system or at least a computer-aided module for the open-loop and closed-loop control of the running process. In the present context, a control system is understood to mean a computer-aided technical system that comprises functionalities for representing, operating and controlling a technical system, such as a manufacturing or production installation. In the present case, the control system comprises sensors for determining measurement values, as well as various actuators. Additionally, the control system comprises what are known as process-oriented components, which serve to actuate the actuators or sensors. Furthermore, the control system has inter alia means for visualizing the process installation and for engineering. The term control system is additionally intended to also encompass further computing units for more complex closed-loop controls and systems for data storage and data processing.

In the present context, an "operator station server" is understood to mean a server that centrally captures data of an operator control and monitoring system and generally also alarm and measurement value archives of a process control system of a process installation, and makes this data available to users. The operator station server generally establishes a communication connection to automation systems of the process installation and forwards data of the process installation to what are known as clients, which are used for the operator control and monitoring of an operation of the individual functional elements of the process installation.

The operator station server may have client functions for accessing the data (archives, messages, tags, variables) of other operator station servers. This means that images of an operation of the process installation on the operator station server can be combined with variables of other operator station servers (server-server communication). The operator station server can involve a SIMATIC PCS 7 industrial workstation server from SIEMENS, without being restricted to this.

A measurement device is either a generator or receiver of one or more analog or binary signals. Examples of devices of this kind are measuring transducers, binary sensors or control valves with a position controller.

The method in accordance with the invention can significantly simplify or generalize the configuration of the event-oriented transmission because, due to the automatic self-sensitization (and/or self-desensitization), it is possible to achieve a high degree of thinning out of the process measurement values, where a reproduction of the course is possible after transmission and important events are not lost.

As part of the sensitization or desensitization, as a function of a drop below a minimum transmission rate of the process measurement values from the measurement device to the automation device or an exceeding of a maximum transmission rate of the process measurement values from the measurement device to the automation device, the measurement range is automatically reduced or increased by way of the automation device via a heuristic method.

As a result, the configuration of the event-oriented transmission can be reduced to the stipulating of a minimum/maximum transmission rate, i.e., it is possible to dispense with the configuration of the measurement range and a threshold value. The minimum/maximum transmission rate is also generally a fixed variable in established methods, which only depends upon a category of the measurement device (for example, the maximum transmission rate is chosen to be higher for pressures and rotational speeds than for temperatures and flow rates).

The heuristic method may reside, for example, within half the distance between process measurement value and upper and lower limits of the measurement range.

It is also an object of the invention to provide an automation device, which is configured to implement a method as previously explained. An automation is understood to mean the autonomous (automated) capturing and influencing of physical variables with the aid of technical means. In this context, machines, installations or other facilities are generally made capable of working autonomously. In this context, automation devices are used to implement an automation and may be, for example, programmable logic controllers having processors and memories, which represent a higher-level control function for lower-level programmable logic controllers.

It is an additional object of the invention to provide a control system of a process-engineering installation, which comprises an automation device, which is configured to implement a method as previously explained.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The above-described properties, features and advantages of this invention and the manner in which these are achieved will now become clearer and more intelligible in conjunction with the following description of the exemplary embodiment, which will be explained in detail making reference to the drawings, in which.

DETAILED DESCRIPTION OF THE EXEMPLARY EMBODIMENTS

Figure 1:
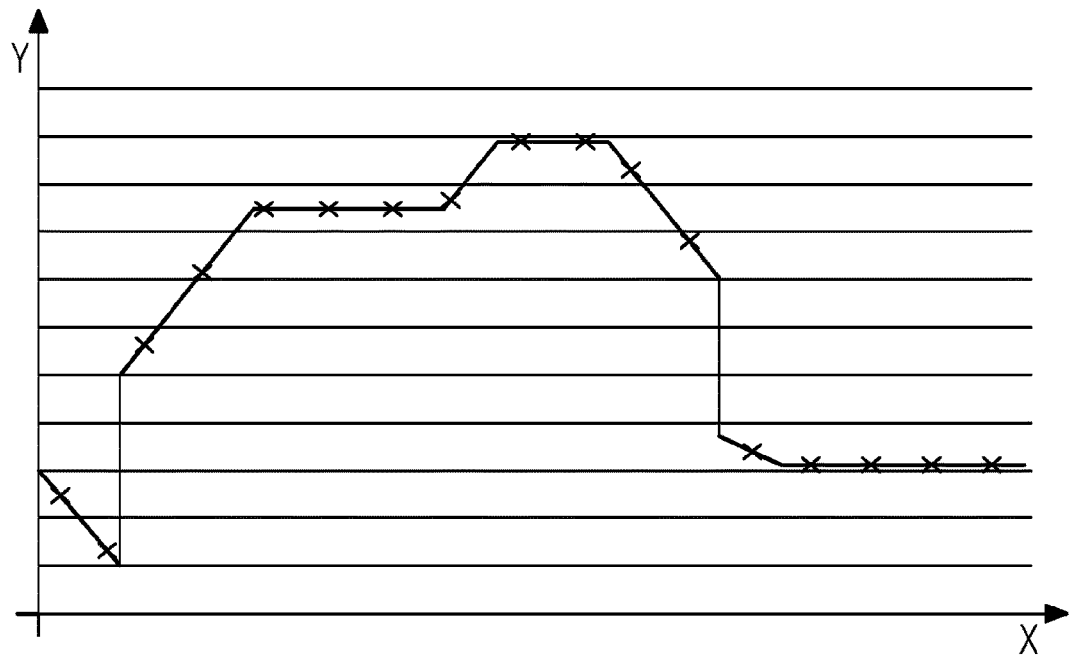
FIG. 1 shows a course of a process measurement value processed in accordance with the prior art.

FIG. 1 shows an exemplary course of a process measurement value in an XY diagram with arbitrary units. The process measurement value is processed cyclically in an automation device. The quantity of process measurement values is to be thinned out before the transmission to an operator station server of a control system of a process installation, in order to avoid having to transmit each individual process measurement value.

A method for the event-oriented transmission in accordance with the prior art is used, which uses a measurement range configured in a fixed manner, a minimum and maximum transmission rate as well as a threshold value for the hysteresis. In the course in accordance with FIG. 1, the process measurement values that are marked with crosses have been selected by the conventional method for transmission from the automation device to the operator station server. It can be seen that a good reduction is achieved with the configured measurement range with strong thinning out. A reproduction of the process measurement value course is imprecise, however, because no process measurement values are transmitted during important events (jumps and "kinks").

Figure 2:
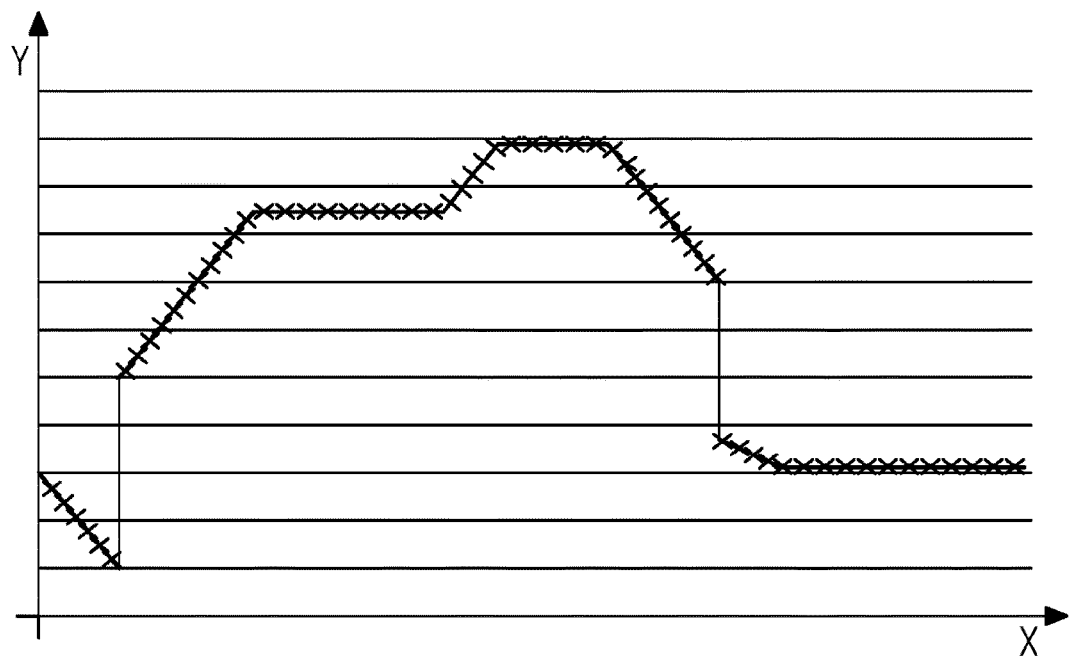
FIG. 2 shows a further course of a process measurement value processed in accordance with the prior art.

In contrast to FIG. 1, for the same course of process measurement values, a measurement range with a low thinning out is chosen in FIG. 2, so that reproduction is more accurate, because process measurement values are also transmitted during important events (jumps and "kinks"). Conversely, however, only a low reduction is achieved during the transmission of the process measurement values from the automation device to the operator station server; particularly in the regions with low change, considerably more process measurement values are transmitted than would be necessary. What is essential is the measurement range during the accumulation of the process measurement value changes since the last transmission:
  if the measurement range is chosen to be too small, then accumulation occurs too quickly and accordingly too many process measurement values are also transmitted, which has negative effects on the achievable transmission rate;
  if the measurement range is chosen to be too large, then accumulation occurs too slowly and accordingly few process measurement values are transmitted, which has negative effects on a reproduction of the process measurement values.

For an optimum configuration (measurement range, minimum/maximum transmission rate, threshold value), a project engineer of the process installation must set the suitable parameters measurement point by measurement point or measurement device by measurement device. The process installation also must move within the parameters configured for this. Exceptional situations, such as the commissioning of sensors, failures of sensors or other interruptions, for example, therefore cannot be optimally transmitted and processed by operators of the process installation.

Figure 3:
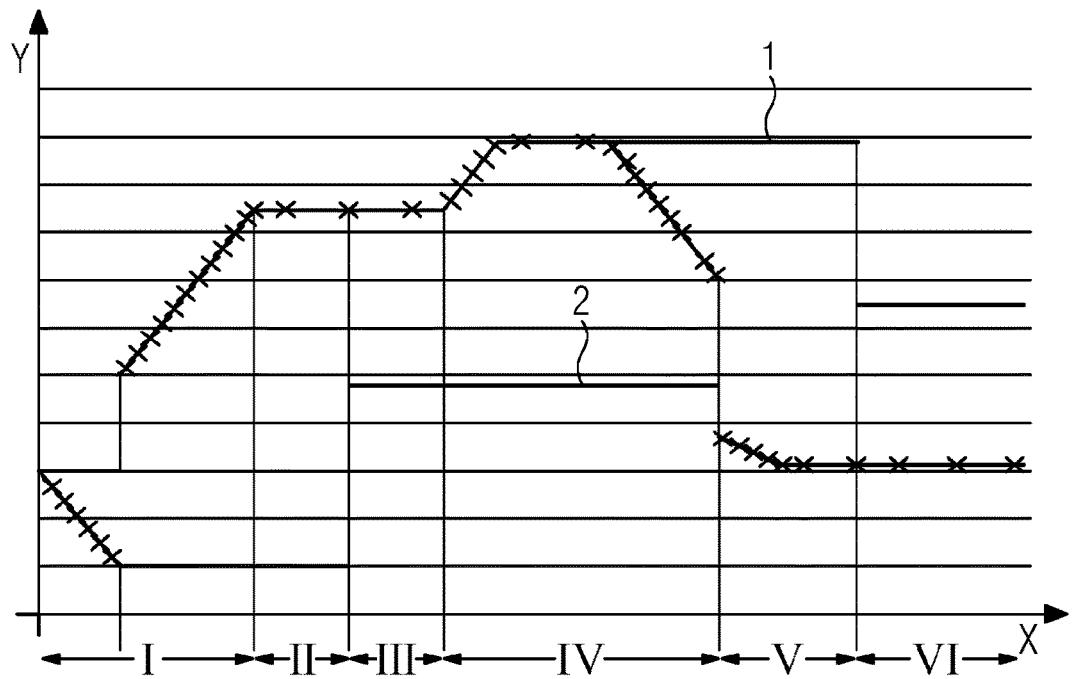
FIG. 3 shows a schematic diagram of a method in accordance with the invention.

In FIG. 3, the principle of the self-sensitizing and desensitizing measurement range is illustrated. This is based on the same process measurement value course as FIG. 1 and FIG. 2. The process measurement values selected for the transmission are marked with a cross. The measurement range is the respective distance between the first curve 1 (at the top in the figure) and the second curve 2 (at the bottom in the figure).

It can be seen that the measurement range changes over the course of the process measurement values:

Section I: the measurement range changes dynamically with the minimum and maximum process measurement values in the range, which leads to a desensitization of the change recognition and thus to a reduction of the process data transmission.

Section II: the process measurement value course has reached a stable level i.e., the measurement range is constant. Considerably fewer process measurement values are transmitted.

Section III: there has been a drop below the minimum transmission rate due to the strong desensitization due to the large measurement range, i.e., the measurement range is dynamically reduced. In this context, a heuristic method is used, in which the distance between the current process measurement value and the upper and lower limits of the measurement range is halved. This is referred to in the present case as sensitization. The process measurement values are now sent again, more quickly, and the change recognition is more sensitive again.

Section IV: due to the previous sensitization, a change in the process measurement values is immediately recognized and transmitted. Due to the change of the process measurement values, the measurement range is adjusted again.

Section V: due to the strong change of the process measurement value, the measurement range is increased again (desensitized), until there is a drop below the minimum transmission rate again due to the process value settling at a level.

Section VI: the measurement range is optimally set to the level of the process measurement value and is no longer modified, i.e., a constant transmission occurs.

Figure 4:
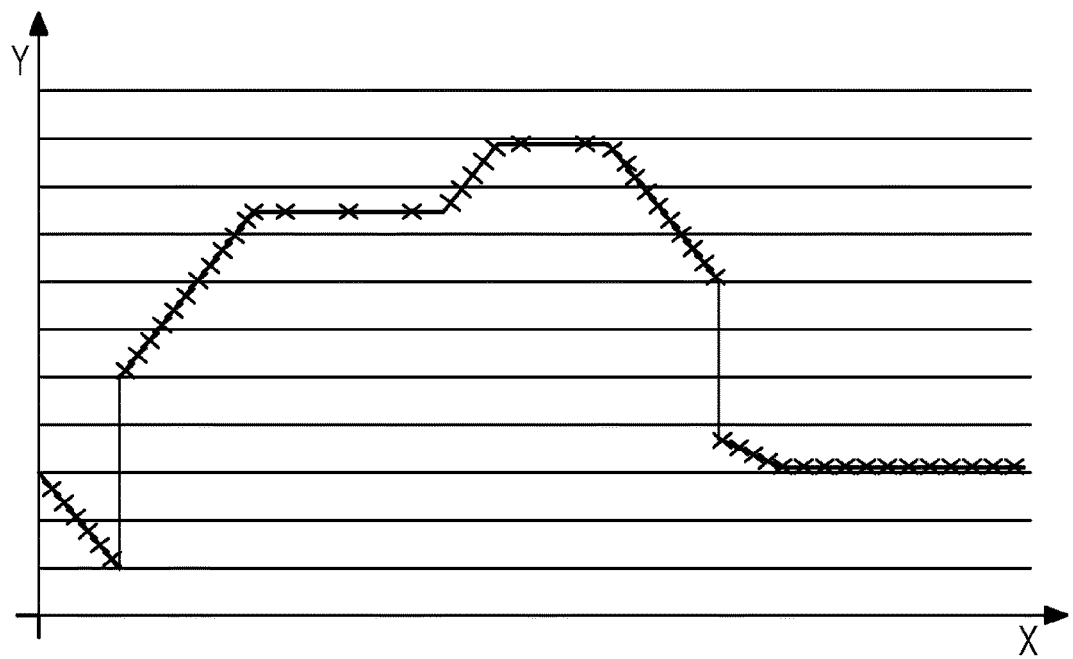
FIG. 4 shows a course of a process measurement value processed in accordance with the method of the invention.

FIG. 4 shows the course of the process measurement values shown in FIG. 1 and FIG. 2 as a continuous line. The process measurement values selected based on the method explained on the basis of FIG. 3 for transmission from the automation device to the operator station server are marked by crosses. It is evident that a very good reduction during the transmission can be achieved, particularly at the settled level of the process measurement value. Nevertheless, it is possible to be able to respond to events in an ad hoc manner during the transmission. Thus, kinks, jumps and gradients, for example, are captured in an exact manner by the transmission, so that reproduction is very possible after transmission from the automation device to the operator station server. Moreover, it is possible to see how the transmission rate is adjusted dynamically within the stipulated limits.

Figure 5:
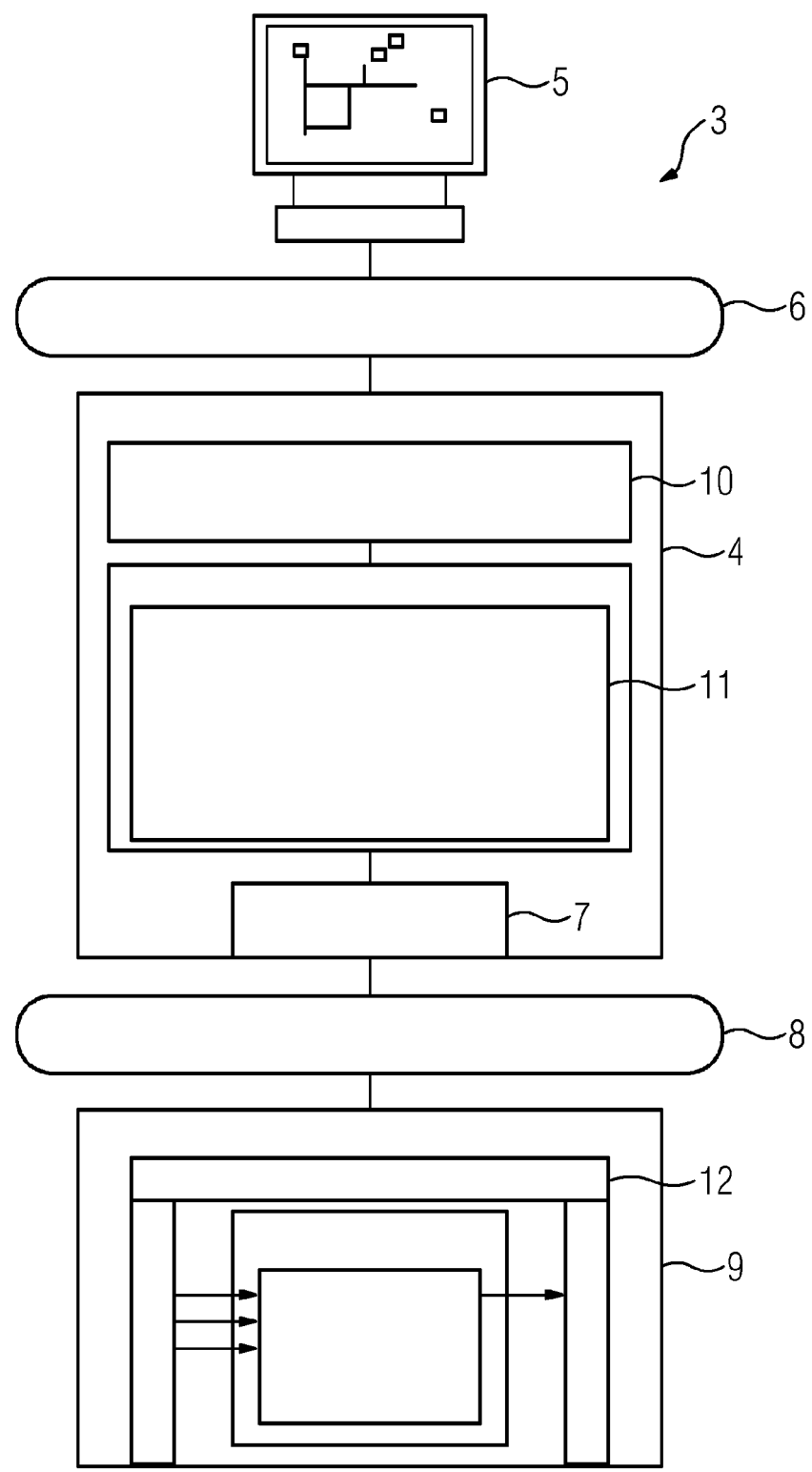
FIG. 5 shows a schematic drawing of a part of a control system in accordance with the invention.

FIG. 5 shows a part of a control system 3 in accordance with the invention of a process installation. The control system 3 comprises a server of an operator control system or an operator station server 4 and an operator station client 5 associated therewith. The operator station server 4 and the operator system client 5 are interconnected via a terminal bus 6 and are connected to further components (not shown) of the control system 3, such as an engineering system server or a process data archive.

A user or operator has access to the operator station server 4 by means of the operator station client 5 via the terminal bus 6, in the context of operator control and monitoring. The terminal bus 6 can be formed as an industrial Ethernet for example, without being restricted to this.

The operator station server 4 has a device interface 7 that is connected to an installation bus 8. This can be used by the operator system server 2 to communicate with an automation device 9 of the control system 3. The installation bus 8 can be formed, without being limited thereto, as an industrial Ethernet, for instance. In turn, the automation device 9 may be connected to any number of subsystems (not shown).

Integrated in the operator station server 4 is a visualization service 10, via which a transmission of (visualization) data to the operator station client 5 can occur. Additionally, the operator station server 4 has a process image 11 of the process installation.

Implemented in the automation device 9 is what is known as an Event Driven Communication (EDC) framework 12, which enables an event-based transmission of process measurement values from measurement devices (not shown) connected to the automation device 9 to the operation station server 4. As part of the EDC framework 12, a sensitization and/or desensitization in accordance with the invention of a measurement range of the process measurement values occurs before the process measurement values are transmitted to the operator station server 4. In this context, the current process measurement values are analyzed by the EDC framework 12 in each cycle of the automation of the process installation. Although the "thinning out" of the process measurement values causes a somewhat higher computational effort for the automation device 9, this is advantageously overcompensated for by the saving of computational effort during the transmission of the process measurement values to the operator station server 4.

Figure 6:
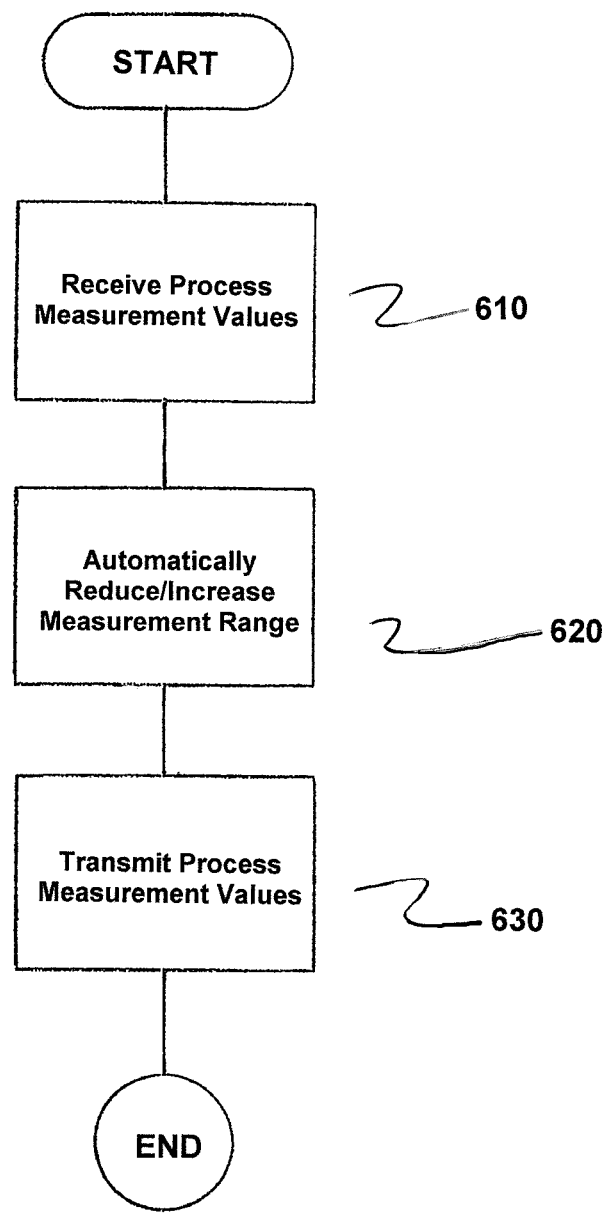
FIG. 6 is a flowchart of the method in accordance with the invention.

FIG. 6 is a flowchart of a method for the event-oriented transmission of process measurement values from at least one measurement device of a control system of a process installation to an operator station server 4 of the control system 3 of the process installation.

The method comprises a) receiving the process measurement values via an automation device 9 of the control system 3 of the process installation, as indicated in step 610.

Next, b) a measurement range of the process measurement values is automatically reduced via the automation device 9 of the control system 3 of the process installation via a heuristic method as part of a sensitization of a change recognition of the process measurement values as a function of a drop below a minimum transmission rate of the process measurement values from the measurement device to the automation device 9, and the measurement range of the process measurement values is automatically increased via the automation device 9 of the control system 3 of the process installation as part of a desensitization of a change recognition of the process measurement values, as indicated in step 620.

Next, c) the process measurement values are transmitted in an event-oriented manner to the operator station server 4 of the control system 3 of the process installation, as indicated in step 630. Here, an event represents a predetermined change of the process measurement values.

Although the invention has been illustrated and described in greater detail with the preferred exemplary embodiment and the figures, the invention is not restricted by the examples disclosed and other variations can be derived therefrom by the person skilled in the art without departing from the protective scope of the invention.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for an event-oriented transmission of process measurement values from at least one measurement device of a control system of a process installation to an operator station server of the control system of the process installation, the method comprising:
    a) receiving the process measurement values via an automation device of the control system of the process installation;
    b) reducing a measurement range of the process measurement values automatically via the automation device of the control system of the process installation via a heuristic method, in which a distance between a current process measurement value and upper and lower limits of the measurement range is halved, as part of changing sensitivity of detection of the process measurement values as a function of a drop below a minimum transmission rate of the process measurement values from the measurement device to the automation device, and increasing the measurement range of the process measurement values via the automation device of the control system of the process installation automatically as part of changing desensitization of detection of the process measurement values; and
    c) transmitting the process measurement values in an event-oriented manner to the operator station server of the control system of the process installation, wherein an event represents a predetermined change of the process measurement values.

2. An automation device, comprising:
a processor; and
memory;
wherein the automation device is configured to:
    a) receive process measurement values within a control system of a process installation;
    b) reduce a measurement range of the process measurement values automatically within the control system of the process installation via a heuristic method, in which a distance between a current process measurement value and upper and lower limits of the measurement range is halved, as part of changing sensitivity of detection of the process measurement values as a function of a drop below a minimum transmission rate of the process measurement values from a measurement device to the automation device, and increase the measurement range of the process measurement values within the control system of the process installation automatically as part of changing desensitization of detection of the process measurement values; and
    c) transmit the process measurement values in an event-oriented manner to an operator station server of the control system of the process installation, wherein an event represents a predetermined change of the process measurement values.

3. The automation device as claimed in claim 2, wherein the automation device comprises a programmable logic controller.

4. A control system of a process installation, the control system including the an automation device as claimed in claim 2.

5. The control system as claimed in claim 4, wherein the automation device comprises a programmable logic controller.

* * * * *